(12) United States Patent
Turner

(10) Patent No.: US 11,629,635 B2
(45) Date of Patent: *Apr. 18, 2023

(54) MOTOR VEHICLE TURBO OR SUPERCHARGER DIVERTER VALVE SYSTEM

(71) Applicant: Accurate Repetition PTY Limited, New South Wales (AU)

(72) Inventor: Brett Turner, New South Wales (AU)

(73) Assignee: ACCURATE REPETITION PTY LIMITED, Peakhurst (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/816,054

(22) Filed: Jul. 29, 2022

(65) Prior Publication Data

US 2022/0364500 A1 Nov. 17, 2022

Related U.S. Application Data

(63) Continuation of application No. 16/916,215, filed on Jun. 30, 2020, now Pat. No. 11,434,812, which is a
(Continued)

(30) Foreign Application Priority Data

Jul. 15, 2013 (AU) .................................. 2013902604

(51) Int. Cl.
| | |
|---|---|
| *F02B 37/16* | (2006.01) |
| *F02B 33/32* | (2006.01) |
| *F02B 33/44* | (2006.01) |
| *F16K 31/383* | (2006.01) |
| *F16K 31/40* | (2006.01) |

(Continued)

(52) U.S. Cl.
CPC ............ *F02B 37/16* (2013.01); *F02B 29/083* (2013.01); *F02B 33/32* (2013.01); *F02B 33/44* (2013.01); *F16K 1/38* (2013.01); *F16K 3/0218* (2013.01); *F16K 31/383* (2013.01); *F16K 31/40* (2013.01); *F16K 31/406* (2013.01); *Y02T 10/12* (2013.01)

(58) Field of Classification Search
CPC ........ F02B 37/16; F02B 29/083; F02B 33/32; F02B 33/44; F16K 1/38; F16K 3/0218; F16K 31/383; F16K 31/40; F16K 31/406; Y02T 10/12
See application file for complete search history.

(56) References Cited

U.S. PATENT DOCUMENTS 8,191,855 B2 * 6/2012 Hezel ..................... F02B 37/16
251/38

\* cited by examiner

*Primary Examiner* — Brandon D Lee
(74) *Attorney, Agent, or Firm* — WCF iP

(57) ABSTRACT

Turbo or super charged intake tract diverter valve system, upstream of a throttle valve, includes a closure means (10) for a diversion aperture (4.1) in the intake tract (3) to vent pressurised gases within to a bypass path or atmosphere; the closure means having a transfer aperture (12) facilitating a net force due to a pressure differential on its opposite sides of the closure means (10) so as to close or keep closed the diversion aperture (4.1). When gas pressure on opposite sides of the closure means is equal, and when an upstream side (10.1) of the closure means (10) has a pressure greater than a downstream side (5.1), then it will open the diversion aperture (4.1). An actuation means opens a control aperture (6) to create the necessary pressure differential on the closure means (10) to thereby cause same to open the diversion aperture (4.1).

10 Claims, 12 Drawing Sheets

Related U.S. Application Data continuation of application No. 16/106,152, filed on Aug. 21, 2018, now abandoned, which is a continuation of application No. 14/905,166, filed as application No. PCT/AU2014/050123 on Jul. 15, 2014, now Pat. No. 10,077,709.

(51) Int. Cl.
    *F16K 3/02*     (2006.01)
    *F16K 1/38*     (2006.01)
    *F02B 29/08*     (2006.01)

MOTOR VEHICLE TURBO OR SUPERCHARGER DIVERTER VALVE SYSTEM

FIELD OF THE INVENTION

The present invention relates to diverter valve systems used with turbocharged or supercharged motor vehicles.

BACKGROUND OF THE INVENTION

Most modern turbocharged vehicle engines include some form of factory-fitted blow-off or bypass valve in the intake tract, the purpose of which is to open during throttle closure to provide a relief path from a diversion aperture for pressurised air that would otherwise cause significant pressure spikes, resulting in damage or reduced life-span of the turbocharger, and also an unpleasant fluttering noise that is deemed unacceptable in a road-going passenger car.

There is also a potential performance improvement, in that without a relief path, rapid throttle closure and the resulting pressure spike can rapidly slow the turbo compressor, leading to a longer delay in returning to peak boost when the throttle is re-opened (i.e. increased turbo lag). Similarly, allowing the bypass valve to relieve too much pressure can also have an adverse effect on turbo lag—evacuating the entire volume of the intake tract means that despite maintaining a higher compressor speed over the short term, when the throttle is re-opened the intake tract must be re-pressurised which causes an increase in lag.

Many factory-fitted bypass valves perform additional tasks, such as limiting boost pressure for engine protection in the event of higher-than-normal boost pressure being detected, and momentary power reduction when required for traction control or during a gearshift in the case of automatic transmissions.

Factory or OEM filled bypass valves. Until recently, most factory-fitted bypass valves have been located somewhere on the engine's intake tract downstream of the turbo compressor, usually being mounted either by hose or flange connection. The vented air from the bypass valve is then directed back to the turbo compressor intake via another hose or duct, thus forming a bypass loop around the compressor.

Newer implementations include a mounting flange built directly into the turbo's compressor cover, which includes separate paths for both the incoming pressure and the vented air to be recirculated in the one flange.

The factor bypass valve can be fitted to this type of flange, and is a direct-actuated solenoid type, that is (=fretted by a signal from the car's Engine Control Unit (ECU). This type of valve features an electric solenoid coil which has a plunger, on which plunger is mounted a valve member to open or close the diversion aperture in the intake tract. The plunger and valve member is biased to the closed position by a spring. When the solenoid is energised, this pulls the plunger into the solenoid coil against the bias of the spring, and the valve member will thus open the diversion aperture. When de-energised, the plunger and the valve member are returned by the spring to the closed condition. In this system the plunger is connected directly to valve member that opens and closes the diversion aperture and thus bypass path.

The OEM system operates as follows: the ECU monitors the accelerator pedal position, and if a rapid reduction in accelerator pedal position is detected, the ECU energises the solenoid coil to open the valve member and thus the bypass path. The ECU typically holds the bypass valve open for approximately 2 seconds, unless it detects that the accelerator pedal position is increased, at which point if will immediately de-energise the solenoid coil and thus close the diversion aperture and the bypass path.

There are three known versions of the factory diverter valve used: the first type uses a diaphragm and poppet-style valve that is connected to the solenoid plunger. There are holes in the face of the piston that transfer pressure to the back of the diaphragm in order to balance the opposing forces that result from the pressure acting on the areas in front of and behind the diaphragm, so that the sum of the forces is theoretically zero. This then means that when energised, the solenoid coil is able to pull the plunger, diaphragm and poppet valve open against the return spring, thereby opening up diversion aperture and the bypass path. When the solenoid is de-energised, the return spring returns the plunger, diaphragm and poppet valve to the closed position.

The second type uses a plastic piston type valve that is connected to the solenoid plunger. Again, there are holes located in the face of the piston to equalise pressure front and back, thereby theoretically creating no resultant force. It operates in the same way as the diaphragm type described above.

The third type is the same as the second type, except it features a slotted "basket" that shrouds the piston. Its purpose can only be assumed to aid closure when the piston is open and the solenoid is then de-energised.

Deficiencies of factory-fitted bypass valves. These factory-fitted bypass valve types all share a common operating principle, which is primarily designed to eliminate pressure spikes and the associated noise. The ECU can only operate the solenoid in two states—on or off. Therefore, because the valve is directly connected to the solenoid plunger in all cases, the valve can only be open or shut. No method is provided for varying the opening size in response to the pressure in the intake tract, and as a result, turbo lag on these cars is less than optimised.

In addition, the evolution of the factoryfitted bypass valves indicates that there are inherent deficiencies in the design of the valve itself.

An inherent deficiency with the first type is that it is commonly known to fail even under normal operating conditions by rupturing of the diaphragm or tearing of the face seal on the piston. The second and third types seek to solve this problem of torn diaphragms, however the fact that the piston is made from plastic means that a close toleranced fit cannot be achieved between the piston and the sleeve. Since there is no diaphragm to seal this gap, a significant amount of air is able to leak from the rear chamber of the piston past the gap and into the recirculation path. This situation is less than ideal for performance, since pressurised air is being lost. Secondly, the piston type valve suffers a condition where it is unable to close, resulting in significant power loss. Once opened and when there is significant air being bypassed, if the throttle is re-opened very quickly and the solenoid de-energised, the piston is unable to close because of the weak return spring and the un-balanced forces on the piston caused by dynamic pressure of air rushing past the face of the piston—under these conditions there is a greater pressure acting on the face of the piston than there is on the back of the piston, causing it to be held open. The only way to get it to close again once this happens is to close the throttle once again until the bypassing air pressure drops enough to let the piston close.

The third type is a further evolution of the second type, with the vented "basket" a clear attempt to diffuse the bypass air to reduce its velocity so it can enter the transfer holes in the face of the piston in order to balance the forces and allow it to close. Unfortunately, this solution is only moderately effective, and certain conditions can still cause this valve type to be held open.

All of the above deficiencies of the three types of factory-fitted bypass valve are especially noticeable when the car has been modified to increase performance through higher boost pressure, as this is often associated with higher intake temperatures that can accelerate the rupture of the diaphragm type, and exacerbate the non-closure issue and leaking of the piston types.

After Market Valves: there are two common approaches taken by aftermarket bypass valve manufacturers to solve the problems of the factory-fitted bypass valves. Both methods involve replacing the entire factory-fitted solenoid coil and valve entirely with a pneumatically-operated valve. Where the two methods differ however is how the pneumatic valves are controlled.

One method supplies a 3-port solenoid valve that alternately connects a vacuum source and a pressure source to the pneumatic bypass valve—vacuum causes the bypass valve to open, pressure makes it close. The 3-port solenoid valve supplied with this kit connects to the factory wring harness in the engine bay so it utilises the same signal from the ECU to determine when to open the bypass valve.

The second method does not use the ECU signal at all. Instead, it simply connects the bypass valve directly to the intake manifold, thereby causing the valve to open when the throttle is closed and the intake manifold is in vacuum, and when the throttle is open the intake manifold is pressurised and therefore the bypass valve is closed. This is the common method used by most after-market bypass valves.

Deficiencies of After-Market valves: despite both methods used in the after-market valves ensuring the deficiencies of the factory-fitted bypass valve are overcome (i.e. robustness, preventing boost pressure leaks, and the ability to close when required), these methods have their own set of deficiencies that cannot be overcome regardless of the design of the hardware.

The first method retains the ECU control, which is desirable for rapid response of the bypass valve opening, however to achieve this, the apparatus supplied in order to carry out this method is extensive, expensive, and time-consuming to install. The apparatus required to carry out the first method must include: a means to provide a hose connection to the intake manifold; a 3-port solenoid valve; a means of electrically connecting the 3 port solenoid valve to the factory wiring harness; a mounting bracket to hold the 3 port solenoid valve in place; sufficient lengths of vacuum hose to connect the 3 port solenoid valve; and a pneumatically-operated bypass valve. Installation of this apparatus requires significant time, typically at least an hour by an experienced vehicle mechanic.

Even once the above apparatus is installed, there is a key performance deficiency in reaction time. The addition of the 3 port solenoid valve and the associated lengths of vacuum hose connecting it to the bypass valve mean that there is a time delay between the ECU energising the 3 port solenoid valve and the bypass valve opening. This is further hindered by the fact that this apparatus still requires a vacuum before the bypass valve can begin to open—even when the 3 port solenoid has switched the source to the intake manifold, the throttle needs to be mostly closed before the intake manifold has sufficient vacuum to open the bypass valve. By this time a pressure spike may have already occurred.

The second method suffers similar deficiencies. The apparatus required to carry out the second method must include: a means to provide a hose connection to the intake manifold: a means to provide an electrical ballast load to the factory wiring harness to prevent the ECU from detecting a bypass valve fault since the factory-fitted solenoid coil has been removed: sufficient lengths of vacuum hose to connect the intake manifold valve to the bypass valve; a pneumatically-operated bypass valve. Like the first method, installation of this apparatus requires significant time, typically at least an hour by an experienced vehicle mechanic.

This method also suffers from delayed opening time for the same reason as the first method—the apparatus requires the intake manifold to achieve sufficient vacuum to aid bypass valve opening, by which time a pressure spike has already occurred.

Both methods require additional apparatus, which adds significant cost to the kit, complexity and time of installation, and therefore increased cost of installation. All of this comes at the expense of a delayed response time of the bypass valve, thereby failing to achieve one of the primary purposes of a bypass valve.

Any reference herein to known prior art does not, unless the contrary indication appears, constitute an admission that such prior art is commonly known by those skilled in the art about which the invention relates, at the priority date of this application.

SUMMARY OF THE INVENTION

The present invention provides a or super charged intake tract diverter valve system having a valve body adapted to be sealingly mounted to said intake tract upstream of a throttle valve associated with said intake tract, said body including a closure means to operatively close off a diversion aperture in said intake tract so as to vent pressurised gases in said intake tract to a bypass path or atmosphere at predetermined times, said system including an actuation means to allow said closure means to open whereby pressurised gases in said intake tract will pass through said diversion aperture into said bypass path or to atmosphere, characterised in that said closure means includes a chamber associated with said valve body and a valve member which cooperates with said chamber to close said diversion aperture, said valve member including at least one transfer aperture through it, said valve member being configured so that by means of said pressurised gases, said valve member has a net force provided from a surface area differential with respect to opposite sides of said valve member so as to close said diversion aperture or keep it closed, when gas pressure on opposite sides of said valve member is equal, and when a pressure differential is created so that an upstream side of said valve member has pressure greater than a downstream side, then said valve member will move to open said diversion aperture, said system including said actuation means associated with said chamber or said valve member, whereby when controlled to do so, said actuation means will open a control aperture associated with said chamber or said valve, to thereby create said pressure differential on the valve member to thereby cause same to open said diversion aperture.

The valve member can be a generally hollow piston with said hole being through an otherwise closed off end of said piston.

The chamber can be formed from side walls attached to said valve body and said piston.

The valve member and said chamber can be of a generally cylindrical construction.

The ratio of cross sectional area of said transfer aperture with respect to the cross sectional area of said control aperture is less than or equal to 1:2. This can be said another way, namely that the cross sectional area of the control aperture is at least twice the magnitude of the cross sectional area of the transfer aperture in the valve member.

The surface area of said valve member on the upstream side, which is directly exposed to said pressurised gas, is less than the surface area of said valve member on the downstream side which is exposed to said pressurised gas via said transfer aperture.

The surface area on the downstream side of said valve member can be one or more of the following: at least 10% greater than that of the upstream side; at least 20% greater than that of the upstream side; at least 30% greater than that of the upstream side.

The actuation means can be activated by a vehicle's engine control unit or ECU.

The actuation means can include a solenoid, or a control valve member cooperating with a solenoid, to open or close said control aperture.

A return spring can be provided between one end of said chamber and said valve member so that said valve member when in a closed condition has one of the following: no pre-load force from the return spring; the pre-load force is in the range of greater than zero and up to 0.2 kg.

The spring provides a pre-load force greater than zero, so as to urge the valve member to close said diversion aperture at an appropriate pressure differential.

The return spring can provide said valve member with a stroke length which is dependent upon the amount of pressure located in said intake tract.

The diversion aperture can remain fully closed when the pressure in said tract is not sufficient to open said valve member against said return spring, even when the vehicle's engine control unit is energising the actuation means.

The diverter valve system as described above can be provided and or constructed as an OEM component or assembly.

The diverter valve system as described above can be provided or constructed as an after-market component or assembly, in which case the valve can be constructed from a kit of parts, which utilises a vehicle's original factory fitted solenoid coil, and valve mounting flange, Further, the vehicle's original factory fitted solenoid return spring can also be utilised or as is most preferred a stiffer spring than the factory one can be provided.

The actuation means can be located in the valve body adjacent the valve member or the actuation means can be located in a body remotely located from said body having said valve member; in which case between said body remotely located from said body having said valve member and said body having said valve member the respective ports are interconnected by means of flexible tubing.

The present invention also provides a method of operating a turbo or super charged it take tract diverter valve system, said method comprising the steps of providing a piston to open and close a diversion aperture of a bypass path, said piston having a transfer aperture through it, and an upstream surface area adapted to be in contact with a pressurised gas on an upstream side of said diversion aperture, which upstream surface area is less than a downstream surface area which will act under pressure of gas passing through said transfer aperture, providing a chamber to cooperate with said piston which has a control aperture therein, said method including the step of closing or opening said control aperture by means of an actuatable valve member, to allow said piston to open or close said diversion aperture.

A return spring can be provided between a portion of said chamber and said piston so that said piston will have its stroke length dependent upon the amount of pressure located in said intake tract.

The diversion aperture can remain fully closed when the pressure is not sufficient to open when the vehicle's engine control unit is energising the solenoid.

The present invention further provides an automobile engine having a turbo or super charged intake tract diverter valve as described above or has a diverter valve that operates by the method described above.

The present invention also provides an automobile raving an automobile engine as described above.

BRIEF DESCRIPTION OF THE DRAWINGS

An embodiment or embodiments of the present invention will now be described, by way of example only, with reference to the accompanying drawings, in which.

DETAILED DESCRIPTION OF THE EMBODIMENT OR EMBODIMENTS

Figure 1:
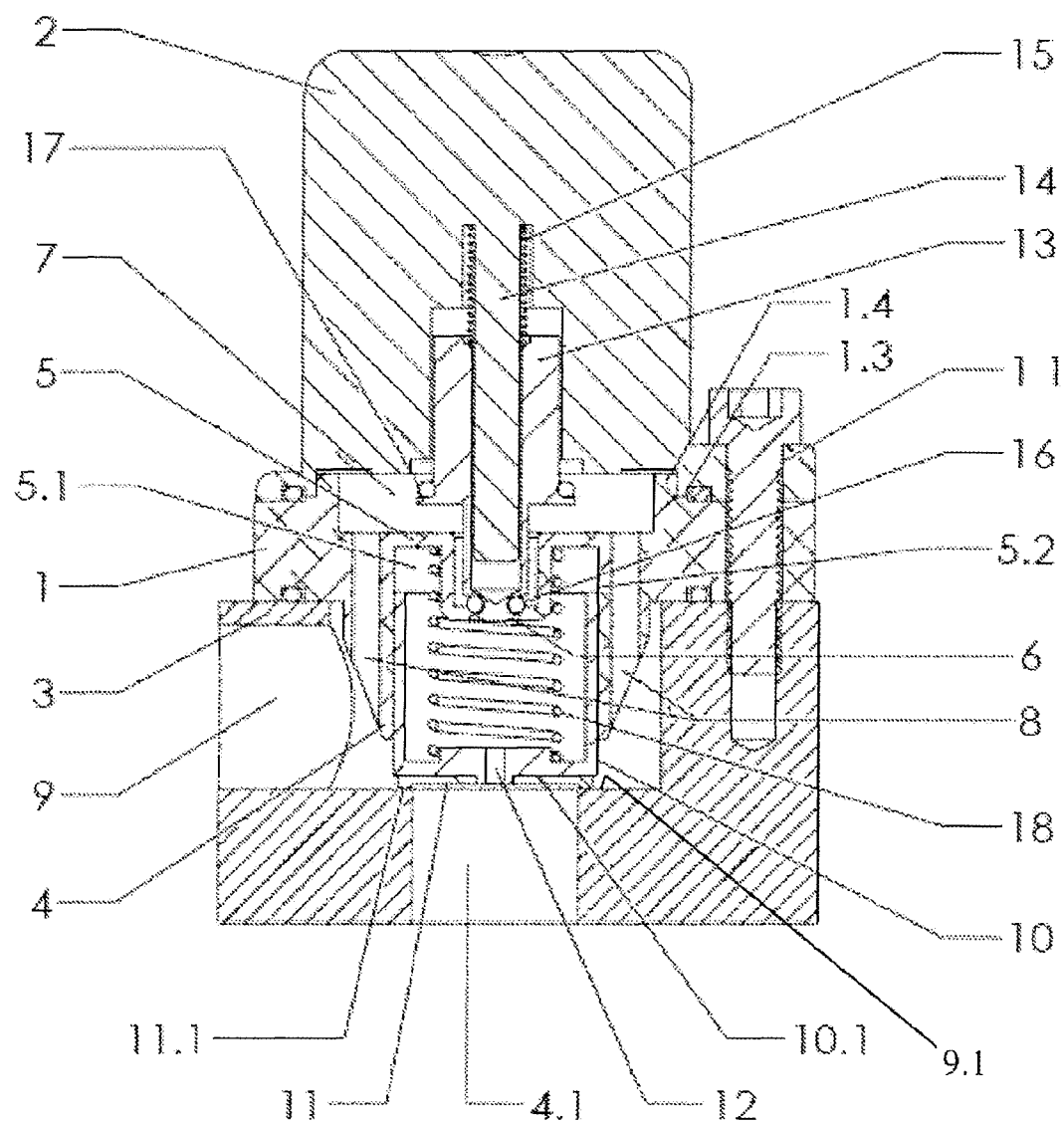
FIG. 1 illustrates a cross section through a turbo or super charged intake tract dweller valve, in the closed condition.
Figure 2:
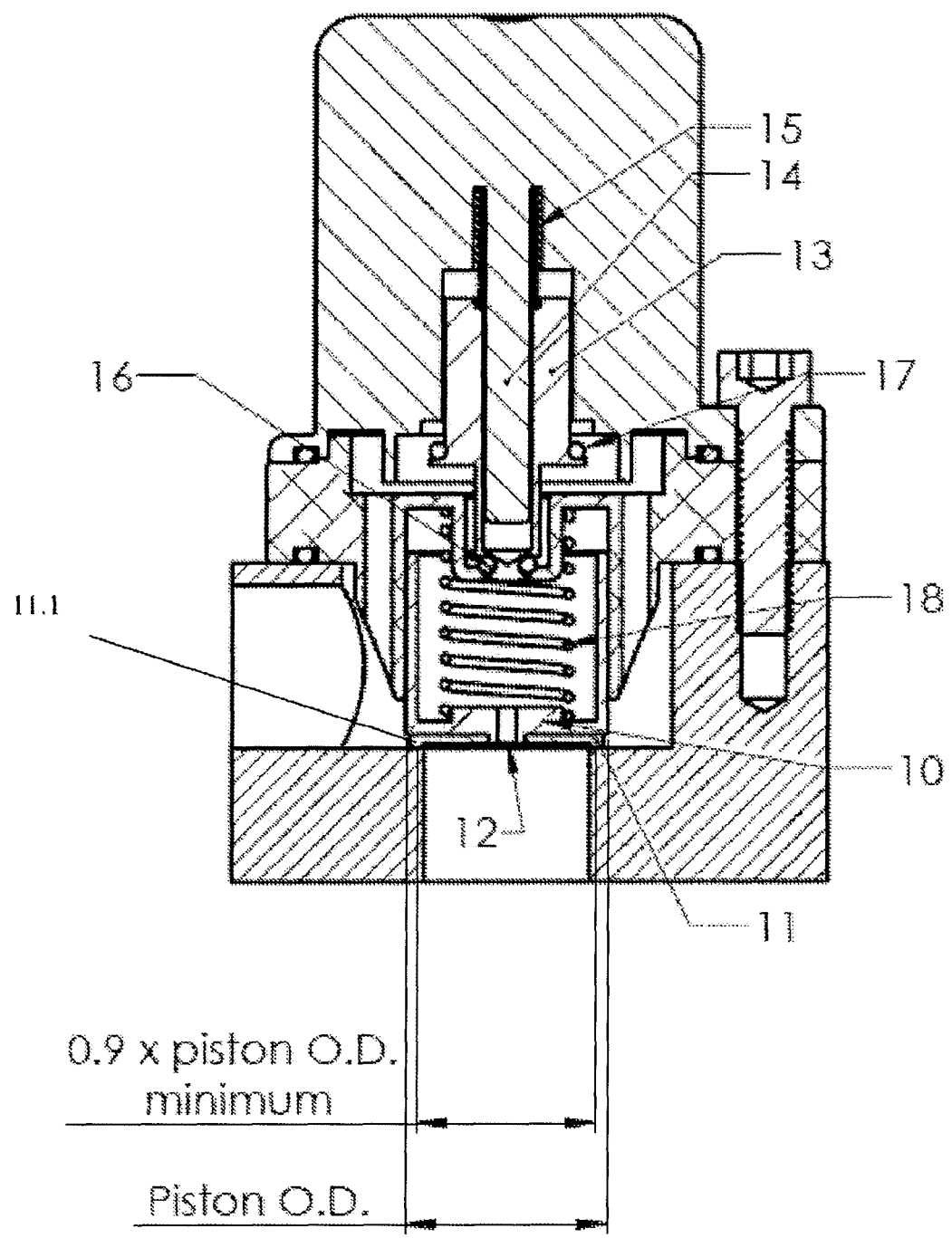
FIG. 2 illustrates a view similar to FIG. 1, identifying additional component and indicating the piston inside and outside diameters.

As illustrated in FIGS. 1 and 2, the diverter valve system comprises a valve body 1 whose outer profile conforms to that of a vehicle's factory fitted solenoid coil body 2 and that of the mounting flange 3 which may be on the turbocharger compressor or other component of the engines intake tract, so that the valve body 1 is sandwiched between body 2 and flange 3.

The valve body 1 contains a cylindrical wall 4 that is part of a bypass path 9 that leads back to the turbocharger compressor inlet. The wall 4 includes a chamber 5.1 which is formed by upper cylindrical wall 5.2 of cylindrical wall 4 and which is closed off by a wall 5 at the end within the valve body 1. The wall 5 contains a control aperture or hole 6, that allows the passage of air through it into a chamber 7 on the other side of the wall 5, and is bounded by the face of the solenoid coil body 2 when assembled. At least one transfer passage or passages 8 are included in the valve body 1 so as to allow passage of air from the chamber 7 to the outside of the valve body 1, via the recirculation passage or bypass path 9 when the valve is installed on a vehicle. It will be noted from FIGS. 1 and 8 that the cylindrical wall 4 is formed in a frustoconical formation 1.6, and that the lowermost rim 1.5 of this formation 1.6 is located at a distance (see arrow 4.2 in FIG. 4) of approximately 5 mm. This distance is the same distance measurement which the piston valve of FIG. 7 will open to. Further this distance of 5 mm will produce an opening to allow air for the diversion aperture 4.1 to directly flaw through into the path 9, such that diversion aperture 4.1 and the passage past the rim 1.5 are of similar cross-sectional areas, thereby preventing the rim from obstructing flow into the bypass passage 9.

Figures 8, 8A:
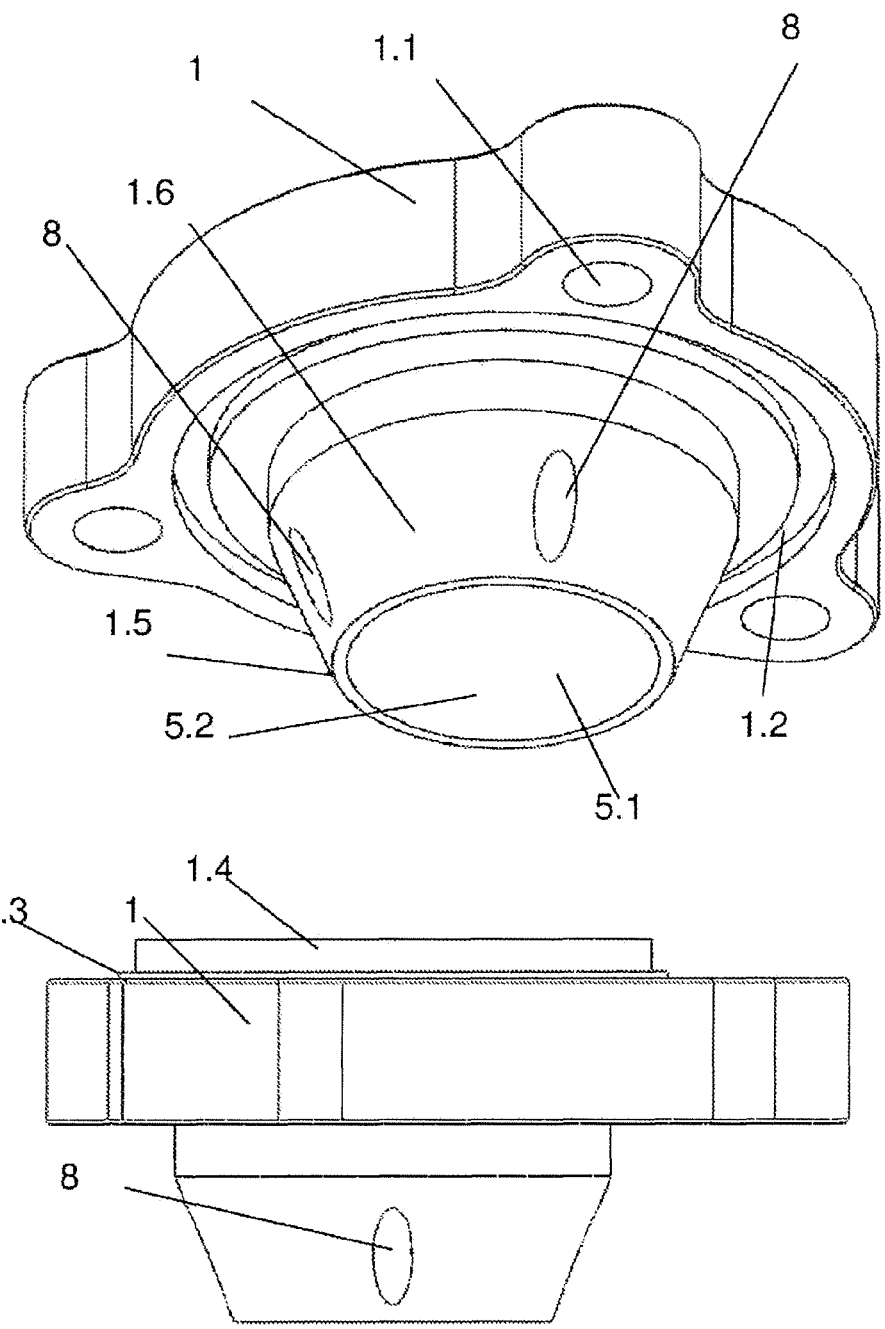
FIG. 8 illustrates an upper perspective view of the valve body 4 of the FIGS. 1 to 5 valve arrangements.
FIG. 8A illustrates a side view of the valve body 4 of FIG. 8.
Figure 10:
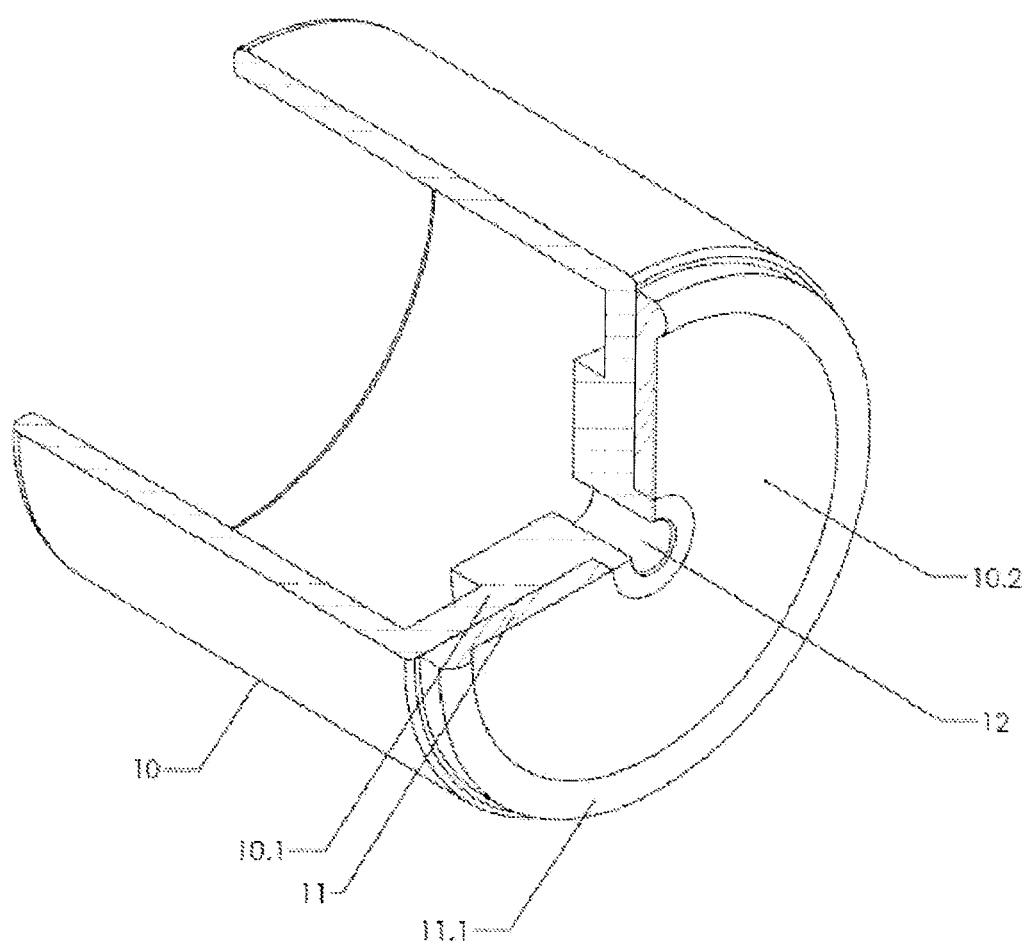
FIG. 10 is a perspective partial cross section through the piston 10 of the previous Figures showing in more detail some of the features of the piston.

From FIGS. 8 and 8A it will be noted that the four transfer passages 8 are angularly equi-spaced around the circumference of the frusta-conical portion 1.6, with centres located on a concentric pitch circle diameter, and thus radially outwardly of the cylindrical wall 4, which produces an elliptical exit port from each of the passages 8. Four transfer passages are used in the embodiment of FIGS. 8 and 8A because of the thickness of the wall though which the transfer passages pass, and other manufacturing reasons. However, it will be understood that the number of transfer passages is not critical as long as the flow through the transfer passage or passages does not impede the flow of air from the control aperture. As will also be described in a later embodiment when the body is split so that the valve body and actuator body can be remotely located, a single transfer passage connected by silicone hose will suffice, provided it is of a diameter large enough to permit the required air flow. Thus, the number of passages or the size of a transfer passage is such that there must be sufficient cross-sectional area so as not to impede flow. A cylindrical piston 10, illustrated in detail in FIG. 10, is formed by a hollow cylinder with a substantially closed-off end 10.1. The piston 10 is configured to fit inside the chamber 5.1 with a fit as close a practical to allow free axial movement, typically 0.015 mm-0.05 mm clearance. The closed-off end 10.1 further comprises a face seal 11 which will preferably include a circumferentially arranged bonded silicone bead, for sealing against the floor of the recirculation passage or bypass path 9 when installed, so as to close off the diversion aperture 4.1 at the start of the bypass path when the piston 10 is in the closed position. The closed-off end 10.1 further comprises a transfer or balance aperture 12 that allows passage of air from the upstream side of the piston face (that is on the diversion aperture 4.1 side) to the downstream side which is on the inside of the piston 10. Importantly, the cross-sectional area of this transfer or balance aperture 12 will need to be at least 2 times smaller than the control aperture or hole 6 in the wall 5 of the valve body bore. Further the surface area of the face 10.2 of the piston closed off end 10.1, defined by the contact perimeter of face seal bead 11, should be at least approximately 22% smaller in magnitude than the overall surface area calculated based on the outside diameter of the piston 10 (i.e. piston OD:face seal area is 1:0.78). In terms of ratio of diameters this equates to the diameter of the surface which closes the diversion aperture, is about 0.885 the size of the outside diameter of the piston 10. Another way to say this is that the effective area of the piston 10 on which the pressure acts on the back or downstream side is approximately 27% larger than the effective area of the piston on the upstream side defined by the bonded silicone face seal 11.1 that closes the diversion aperture 4.1, (that is the ratio of face seal surface area to OD surface area is 1:1.27). This surface area differential with respect to opposite sides (namely the upstream and downstream sides) of the piston 10 will ensure that the piston 10 closes the diversion aperture 4.1 or keeps it closed, when gas pressure on opposite sides of the piston 10 is equal.

While it is preferred that there is only a single transfer or balance aperture 12 illustrated, it will be readily understood that more than one transfer or balance aperture 12 could be used. If more than one is used, then the sum of the cross sectional areas of each of the apertures will need to total at least 2 times smaller (that is be 50% or less) than the control aperture or hole 6 in the wall 5 of the valve body bore.

As best seen in FIG. 2, a steel solenoid plunger 13 is designed, sized and shaped so as to fit onto the spigot 14 of the factory-fitted solenoid coil 2 when assembled, with provision for the factory return spring 15. The plunder 13 further comprises a face seal or O-ring 16 that ensures the control aperture or hole 6 in the wall 5 of the valve body 1 is closed off and sealed when the plunger 13 is in the closed position when the factory-fitted solenoid coil 2 is de-energised. An O-ring 17 is provided so as to cushion the retraction travel of the plunger 13 when the solenoid coil is energised, in order to prevent an audible "clack" sound which would otherwise be heard.

A main return compression spring 18 of suitable dimensions and specification is provided so as to produce additional bias or returning force to the piston 10. It is preferred that the return spring provides no pre-load when the piston 10 is in the closed position, or if a preload is provided it is greater than zero but up to and preferably not exceeding 0.2 kg of pre-load when the piston 10 is in the closed position, such as for the vehicles mentioned below. Pre-load is nil or if present is kept in the narrow range described so as to prevent or minimise the occurrence of turbo compressor surge. The spring rate should be such that the spring force is between 1-1.5 kg at maximum piston lift for such vehicles. However, for other vehicular engines these spring parameters may vary in accordance with the pressures in the system and other factors like the turbo specification. The exact spring force and rate (which is a function of spring dimensions) may need to be determined by trial and error to determine a maximum pre-load on the piston 10 prior to the onset of compressor surge. It is believed that no more than 0.2 kg of preload will prevent or minimise such compressor surge.

The compression return spring 18 can be given no preload in the valve system assembly by either the piston 10 being sized such that the dimensions of the chamber 5.1, or the non compressed height of the spring is sized, so that when piston and spring is assembled, and the piston 10 has closed off the diversion aperture 4.1, the return spring 18 is in an uncompressed state. Another way to ensure that no preload is provided by the return spring 18, is to have the uncompressed height of the spring 18 less than the height of the chamber 5.1 when the piston 10 is in the closed off position relative to the diversion aperture 4.1. This will ensure that for the last part of the stroke of the piston 10 to the closed position that the piston 10 is not under the urging of the return spring 18.

Figure 3:
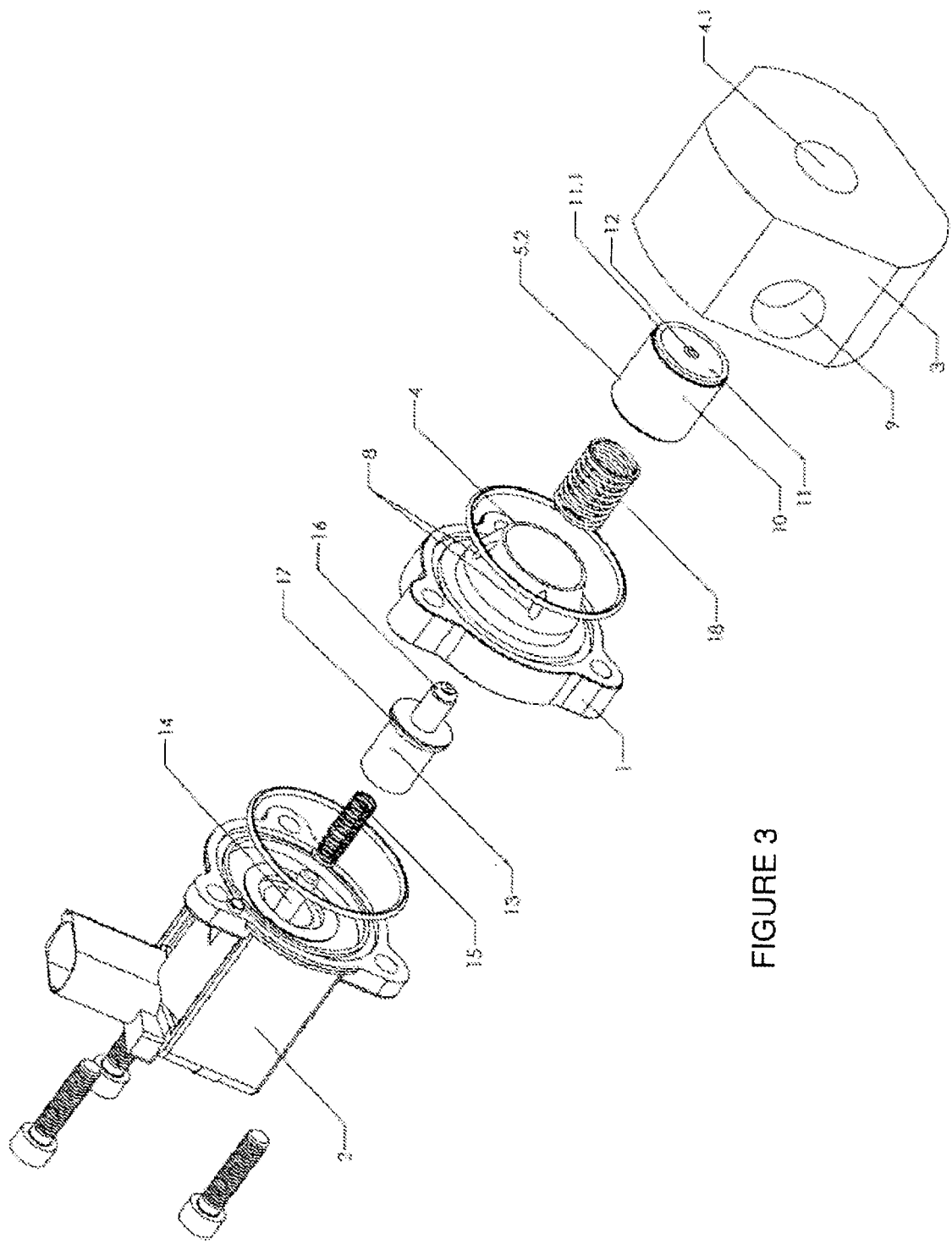
FIG. 3 illustrates an exploded cross sectional view of the components of FIGS. 1 and 2.

The valve of FIGS. 1 and 2 can be constructed on an existing vehicle by removing some of the components of the original diverter valve, and by utilising the original factory-fitted solenoid coil 2. The factory-fitted valve mechanism once removed from the solenoid coil can be discarded. Also used is the factory-fitted solenoid return spring 15, and the mounting flange 3, which may be integrated into the turbocharger compressor cover, or may be remotely mounted and connected to the intake system via hoses, depending upon what is present on the original vehicle. The components described above are then assembled onto the mounting flange as illustrated in the exploded view of FIG. 3.

Operation at the apparatus: Whenever the solenoid coil 2 is de-energised, the solenoid plunger 13 remains in a closed position as illustrated in FIGS. 1 and 2, by means of the return spring 15, thus ensuring the piston 10 and bore or chamber 5.1 define an essentially closed volume, at its downstream end. When boost pressure is present in the turbo system and this is communicated to the upstream face of the piston 10 (upstream relative to the transfer aperture 12), the same pressure is also transferred through the transfer aperture 12 through the closed end 10.1 of the piston 10 into the closed volume behind the piston on the downstream side of the closed end 10.1 and transfer aperture 12. Since the effective area of the piston 10 on which the pressure acts on the back or downstream side is approximately of preferably 27% (face seal surface area:OD surface area is 1:1.27) larger than the effective area of the piston on the upstream side, defined by the bonded silicone face seal 11.1 that closes the diversion aperture 4.1, there is an imbalanced or net force that pushes the piston 10 to close against the upper rim of the diversion aperture 4.1 on the mounting flange 3. Regardless of how high the boost pressure is or may be, the piston 10, due to this arrangement, will always be pushed closed by a force which is 27% greater than the force it would otherwise be pushed open with.

Figure 4:
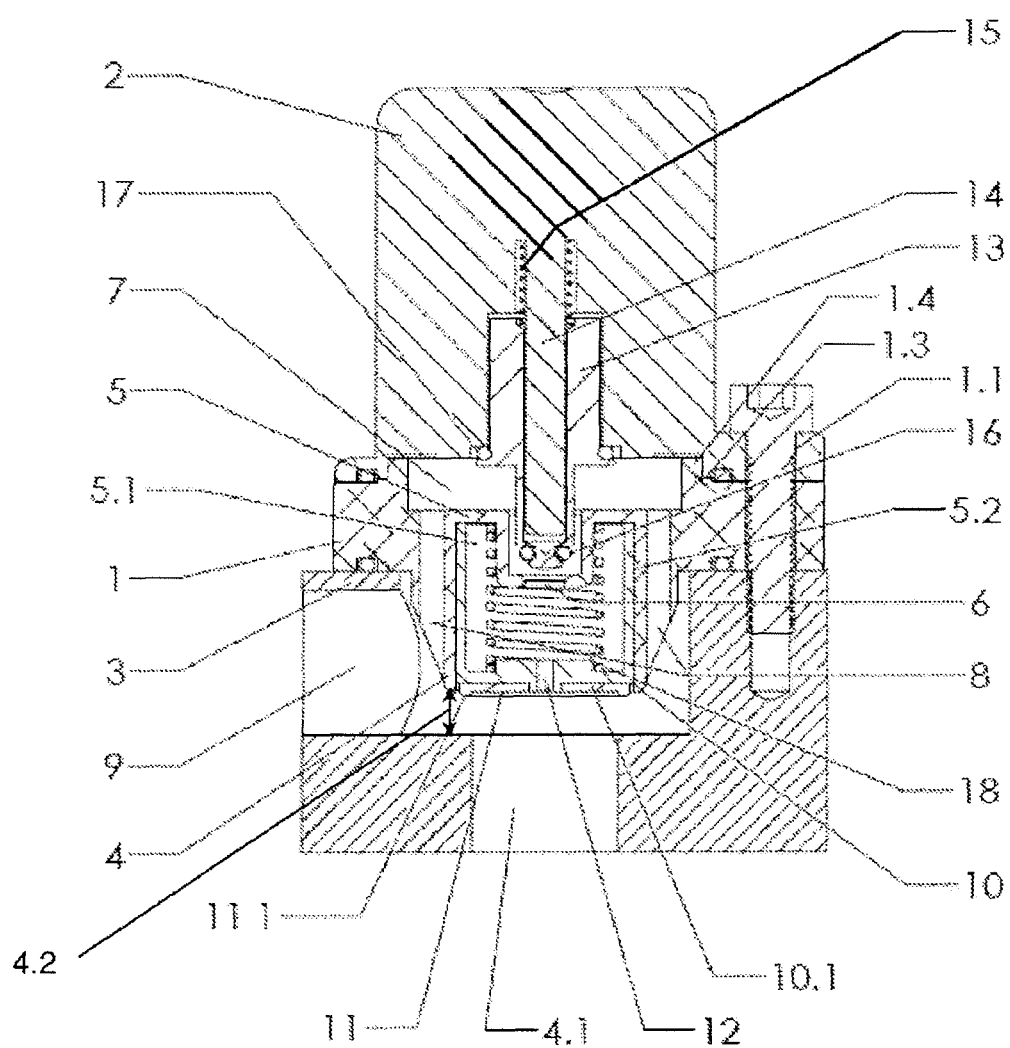
FIG. 4 illustrates a cross section similar to FIG. 1, with the control aperture open and the valve member in the open condition.

When the ECU energises the solenoid coil 2, the solenoid plunger 13 is retracted, thereby opening the control aperture or hole 6 in the wall 5 of the valve body 1, as is best illustrated in FIG. 4. Air which is under pressure is then allowed to flow out of the chamber 5.1 and into the chamber 7 defined by the valve body wall 5 and the solenoid coil body 2. This air can then pass unimpeded through the transfer passages 8 into the recirculation chamber or bypass path 9, which is typically at atmospheric pressure. Because the transfer aperture 12 in the closed end 10.1 of the piston 10 is smaller than the control aperture or hole 6 in the valve body wall 5 and the transfer passages 8, the pressure within the chamber 5.1 defined by the piston 10 and valve body or walls 5.2 will be sufficiently reduced to allow the imbalance of forces, or net force, to push the piston 10 open. When the piston 10 is in the open position, recirculation of the pressurised air by means of the bypass path 9, can take place to prevent pressure spikes in the intake tract.

When the ECU de-energises the solenoid coil 2, the plunger 13 moves back under the bias of the spring 15 so as to close the control aperture 6 and once again seals the valve body chamber 5.1, allowing pressure to equalise on both sides of the piston 10. With equal pressure but un-equal areas exposed to the pressure, the piston 10 is then forced closed again.

Figure 5:
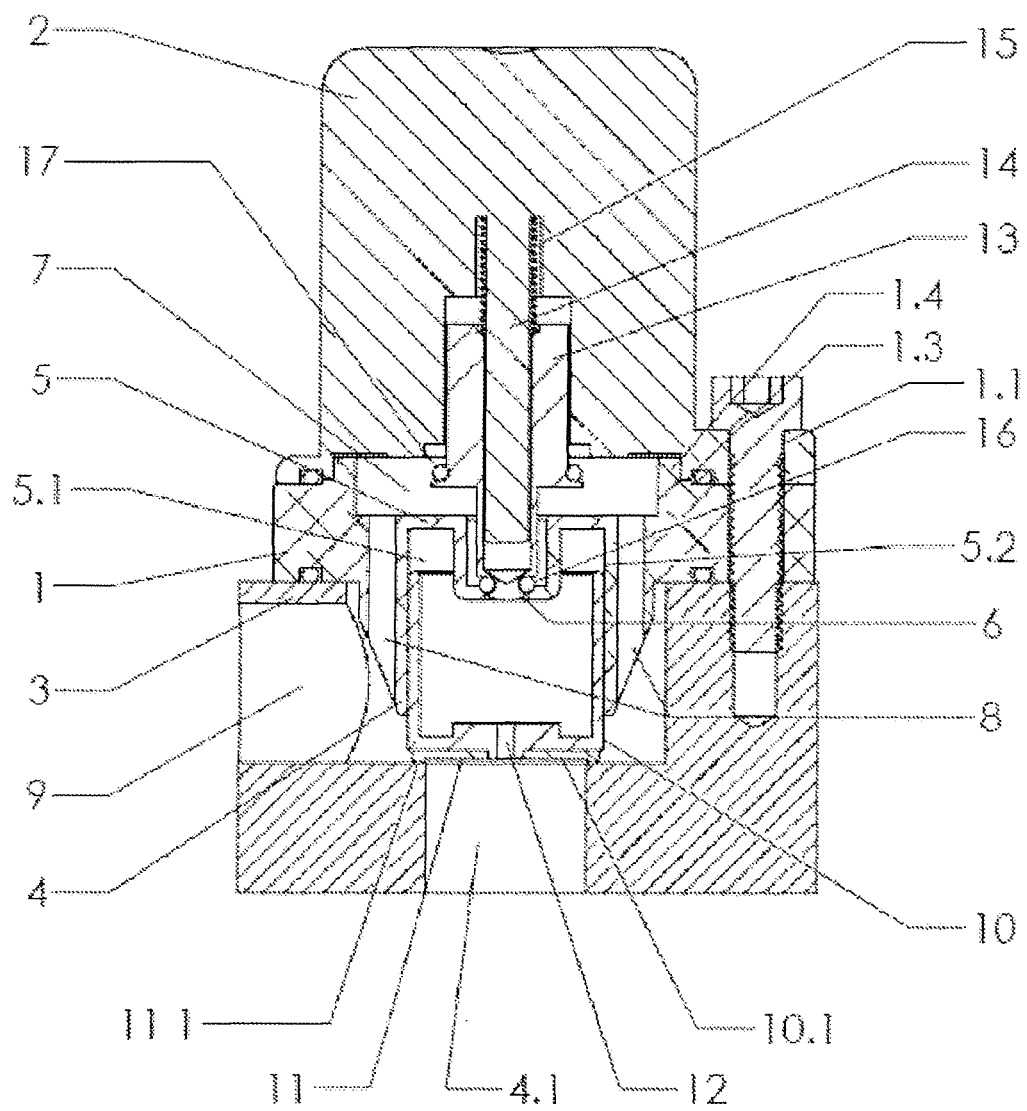
FIG. 5 illustrates a cross section through a valve in a closed condition, similar to that of FIG. 1, except that a return spring is not utilised.
Figure 6:
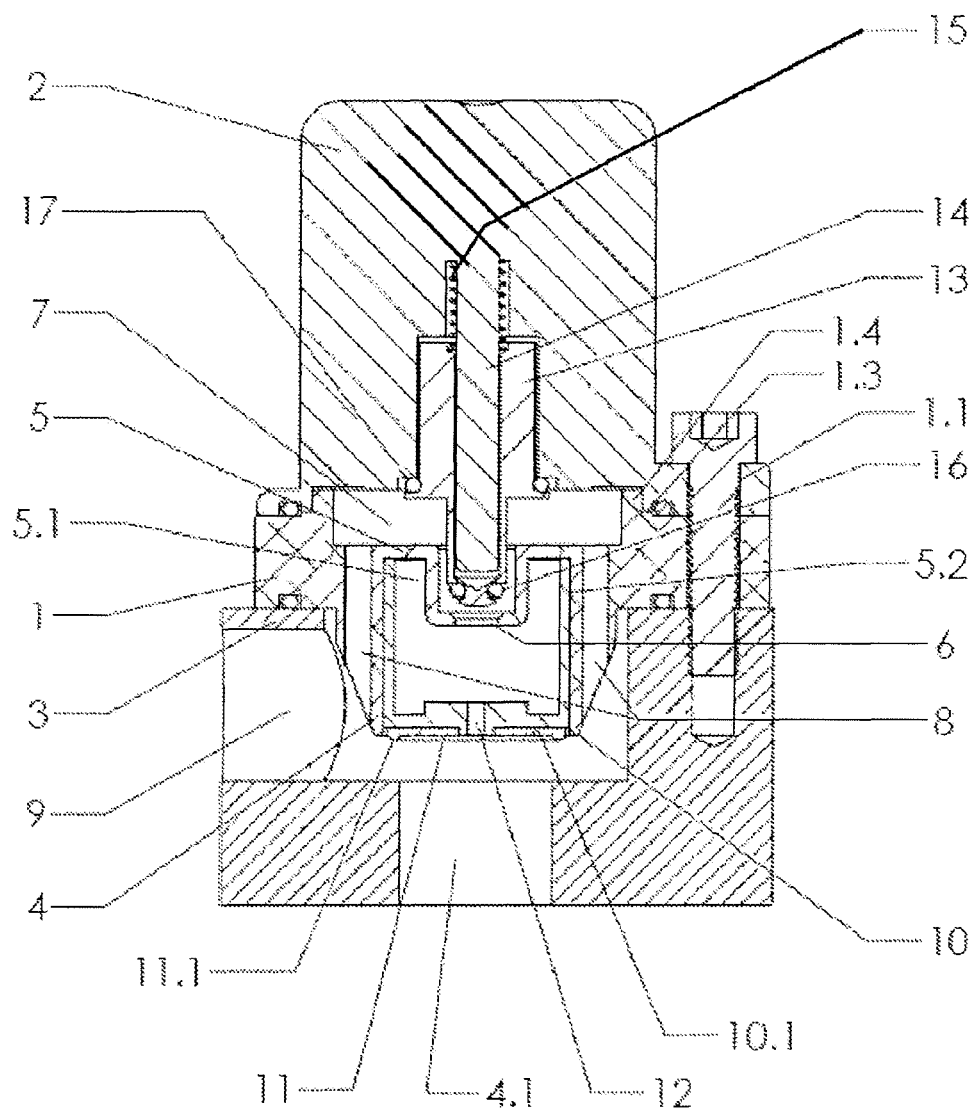
FIG. 6 illustrates a cross section of the valve of FIG. 5 in the open condition, due to the control aperture being open by the solenoid.

In the embodiment of FIGS. 1 to 4, the valve utilises a return spring 18. However, as illustrated in FIGS. 5 and 6, there is another configuration of the apparatus that achieve different but desirable performance objectives. When configured or assembled without the main return spring 18 as illustrated in FIGS. 5 and 6, the valve most closely replicates the behaviour of the factory-fitted bypass valve, in that it operates only in two states, either open as in FIG. 6 or closed FIG. 5. This configuration ensures the quietest possible operation, but still with the ability to open and close reliably even under higher boost pressure and temperature.

However, when the main return spring 18 is used, the main return spring 18 influences the size of the opening created by the piston 10 in response to the boost pressure present in the intake tract and communicated by the diversion aperture 4.1. If boost pressure is low, the piston 10 only opens a small amount of bypass opening, with the key objective being to vent only enough air to prevent pressure spikes. As the boost pressure is reduced by the action of bypassing, the piston 10 closes the diversion aperture 4.1 or decreases the size of the bypass opening, until there is no more pressure and the piston 10 fully closes the diversion aperture 4.1, even when the ECU is energising the solenoid coil 2. If boost pressure is high when the ECU energises the solenoid coil 2, the piston 10 will open further than when the pressure is lower, to allow more air to recirculate. In this situation the size of the bypass passage or opening can be described as variable or dependent upon the amount of boost pressure to be diverted, unlike some of the prior art systems where the amount of opening of the valve is the same at all pressures due to the length of stroke of the direct acting solenoid.

In this way, the piston 10 is given a second means or parameter by which its opening stroke length is controlled. By opening only enough to prevent pressure spikes when the throttle is closed, but not completely evacuating the intake tract, turbo lag can be minimised. This means that the embodiment of FIGS. 1 to 4 may be preferable when better performance is required, but with it may come a slight increase in operational noise.

Key benefits of an after-market embodiment of the apparatus and method: 1. improved operation even under increased boost and operating temperature conditions; 2. simplified apparatus ensures a low-cost solution that is easy to install; 3. fast operational speeds because this apparatus does not require manifold vacuum to open, nor does it need vacuum hoses to be connected that would delay the pressure/vacuum signals; 4. utilizes the factory-supplied solenoid coil which means the benefits of the ECU control signal are retained, and a functioning solenoid coil is not wasted.

While the above description describes an after-market modification so as to use existing mounting systems and the like, it will also be understood that the diverter valve of the invention can be provided as an OEM diverter valve instead of the existing OEM diverter or bypass valves.

Key benefits of an OEM inventive embodiment of the apparatus and method: 1. reliable or improved operation even under increased boost and operating temperature conditions; 2. fast operational speeds because this apparatus does not require manifold vacuum to open, nor does it need vacuum hoses connected that delay the pressure/vacuum signals.

Figure 11:
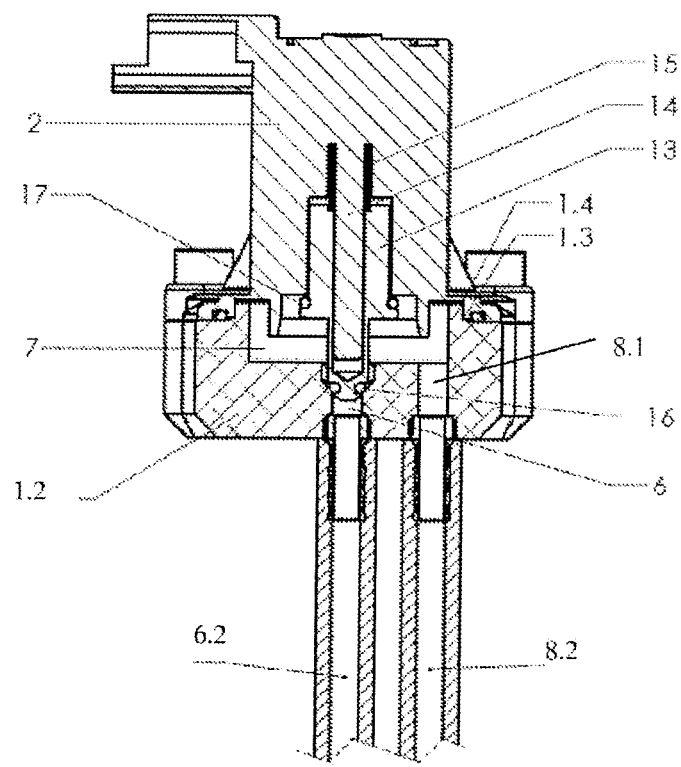
FIG. 11 is a cross sectional view through a valve system which has some parts of the valve of the previous embodiments located remotely from other parts
Figure 11:
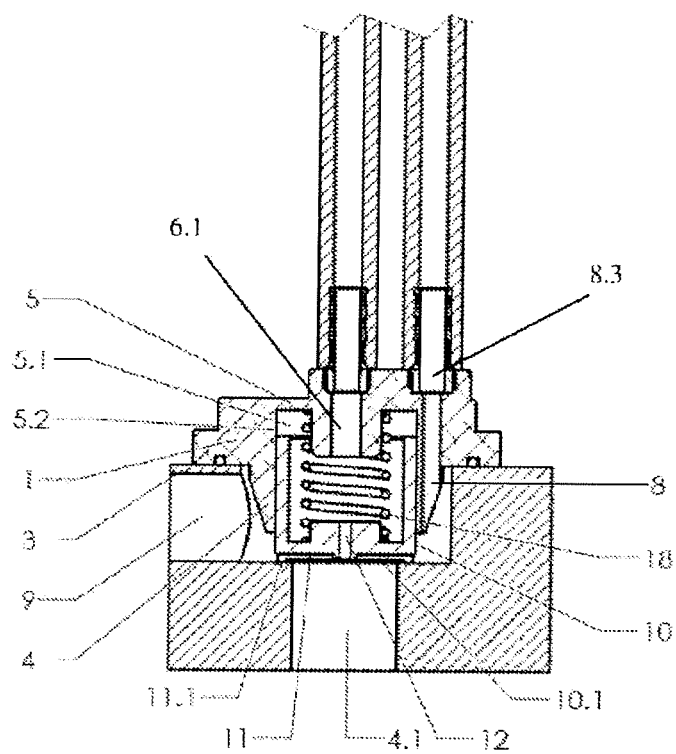
Figure 12:
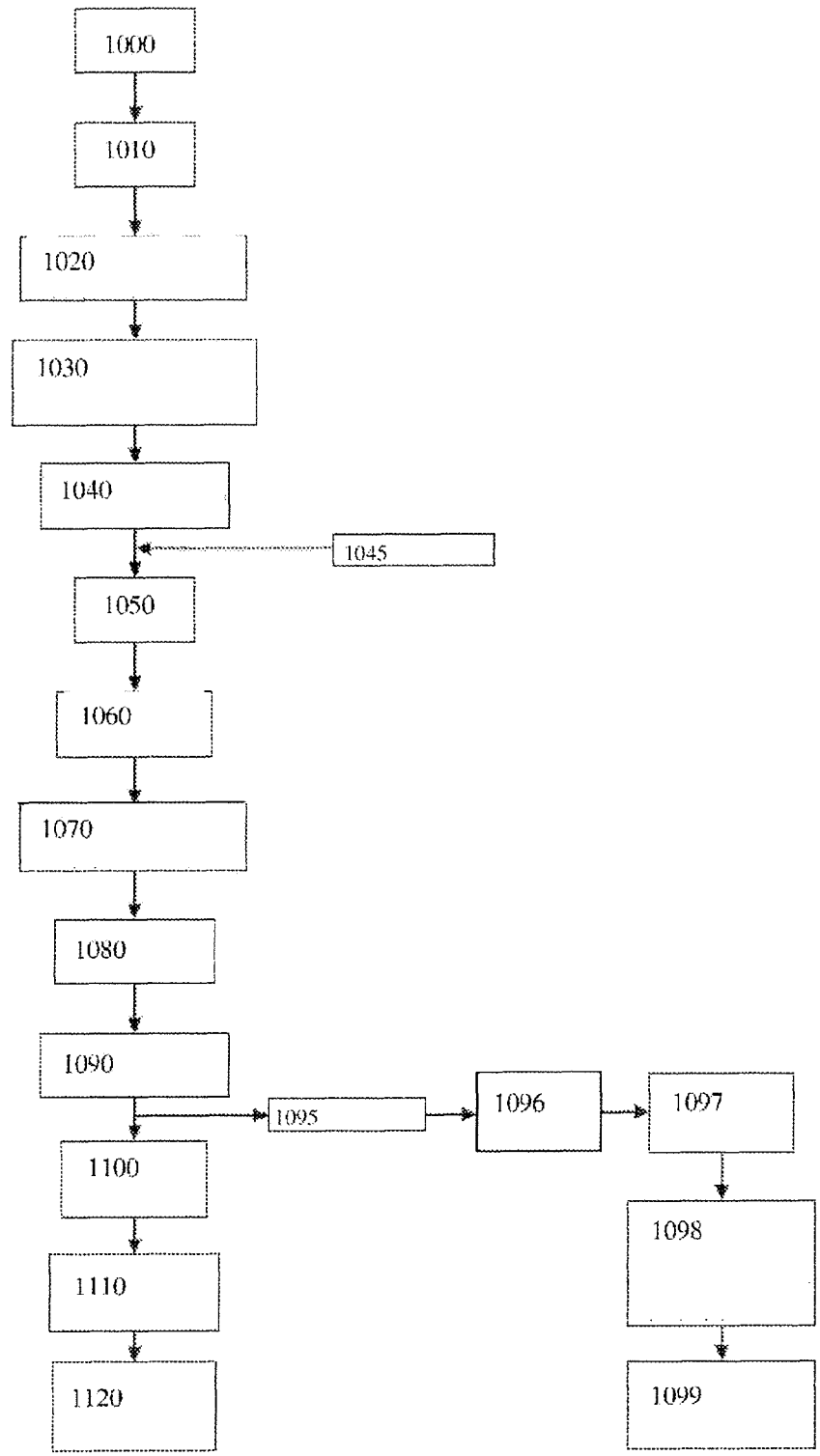
FIG. 12 is a block diagram of the operation method of the diverter valve system of the present invention.

FIG. 12 illustrates a block diagram of the method of operation of the valve system of FIGS. 1 to 6 and 11 which will be described below. In FIG. 12 the items numbers represent the following block diagram steps:

1000—solenoid coil is not energised

1010—piston 10 and plunger 13 are in a closed position

1020—pressure acting on piston face is transmitted to the chamber behind the piston via the transfer aperture 12 in the piston face 1030—pressure on downstream side of piston acts on an area 27% larger than the area on which the pressure acts on the upstream side of the piston 1040—resultant force holds piston in closed position preventing turbo bypassing 1045—throttle closed input 1050—solenoid coil energised by engine's ECU output 1060—plunger 13 retracts opening control aperture 6 in chamber wall 5

1070—air flows through transfer aperture(s) which effectively reduces pressure on the downstream surface area with respect to said transfer aperture 1080—pressure differential overcomes return spring bias if return spring present and or friction between chamber wall and piston and or inertia of the piston to push piston to open the diverter passage 1090—turbo air enters bypass or diverter passages through the valve 1100—pressure in turbo piping reduces to zero as a result of bypassing 1110—resultant force from pressure differential reduces to zero 1120—return spring overcomes reduced force differential and moves piston to closed position and turbo bypassing ceases 1095—engine throttle open 1096—solenoid coil de-energised by ECU unit 1097—return spring pushes plunger 13 to close control aperture 6 in chamber wall 5

1098—pressure equalises on both sides of piston resulting in a 27% force differential which biases the piston 10 the closed position 1099—resultant force and main return spring combine to keep piston closed thereby ceasing diversion or bypass conditions.

The operation of the pilot or valve operating system as described above relies on a number of specific design criteria to function appropriately, as described below.

When the solenoid energises and the plunger 13 is retracted there by allowing airflow through the control aperture 6, and subsequently through chamber 7 and transfer hole/holes 8 must be greater than the airflow through the piston transfer aperture 12, such that pressure behind the piston 10 will be reduced to close to zero.

In a preferred embodiment the piston transfer aperture 12 has a diameter of approximately 2 mm, while the control aperture 6 has diameter of approximately 5 mm, and there are four transfer passages 8 each of approximately 3 mm in diameter. The cross-sectional area of the four transfer passages 8 is greater than that of the control aperture 6, thereby ensuring they create no additional downstream flow restriction or back pressure due to turbulence and/or the length of the transfer passages 13. Because the piston transfer aperture 12 is concentric to the control aperture 6, air passing through the piston transfer aperture 12 creates a jet that is directed into the control aperture 6, which entrains air from the surrounding chamber 5.1 which results in a slight vacuum in the chamber 5.1, thereby aiding the piston 10 moving to the open condition.

The plunger 13 forms part of the path that air must take to evacuate the piston chamber 5.1, and therefore the retract distance of the plunger 13 also plays a role in determining the total flow capacity of the control aperture 6. The plunger 13 must retract sufficiently so as not to restrict flow through the control aperture 6. A preferred retract distance of 1 mm to 2 mm will satisfy this.

The surface area that pressure gets to act upon on the upstream face of the piston is dictated by the diameter of the raised bead 11.1 of the moulded face seal 11. In the closed position, the raised bead 11.1 contacts the floor 9.1 (see FIG. 1) of the bypass path 9 which surrounds the upper rim of the diversion aperture 4.1, so the pressure only acts on the area enclosed by the bead 11.1. When the plunger is in the closed position, pressure on both sides (upstream and downstream of transfer aperture 12) of the piston is equalised, but on the back of the piston 10 the pressure acts on the entire area of the piston outer diameter, which therefore creates a resultant force pushing the piston 10 closed.

For the embodiment described above the preferred bead diameter of 19.5 mm can be utilised, while a piston outside diameter of 22 mm is also utilised, resulting in a face surface area (upstream) to piston surface area (downstream) ratio of 1:1.27, when calculated with the surface area of the transfer aperture 12 removed from the available surface areas. In an alternative embodiment a bead diameter of 21.5 mm can be utilised with a piston outside diameter of 24 mm, however, this will result in a face surface area (upstream) to piston surface area (downstream) ratio of 1:1,247, when calculated with the surface area of the transfer aperture 12 is removed from the available surface areas.

Another parameter to be designed for is the speed at which the piston 10, move from a closed to an open position. It is found that the parameters selected above will produce an appropriate speed of the piston 10 for effective opening of the diverter passage as a replacement for a factory solenoid diverter valve such as that manufactured by Pierburg for Volkswagen/Audi, where the valve of FIG. 7 has part number of 06F 145 710 G—commonly referred to by the Audi/VW community as the "Revision G" model. This valve is used on some Golf GTI, as well as other Audi/VW/Seat/Skoda models that share the same engine. BMW, Porsche, Peugeot and Mercedes also use a similar valve made by the same company.

Figure 7:
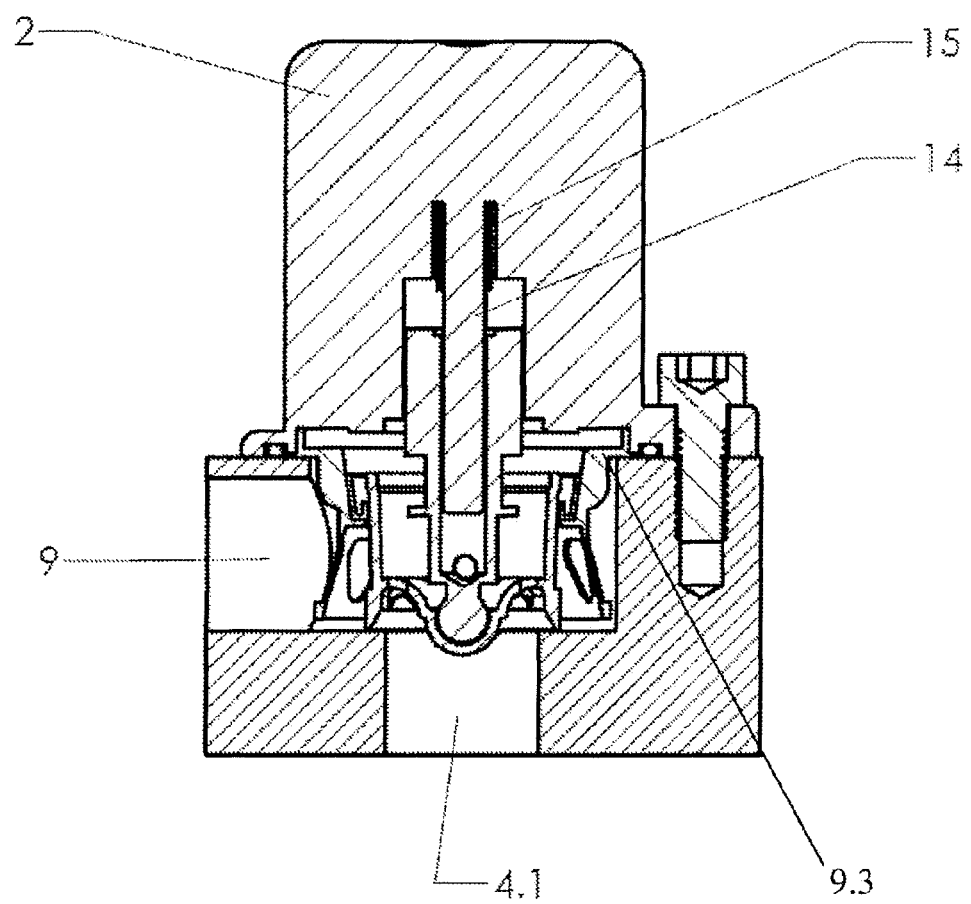
FIG. 7 illustrates a cross section through a prior art diverter valve such as that which is factory fitted or is an OEM valve.

As illustrated in FIG. 7, the standard direct actuating solenoid valve has a mounting flange 3, and in this is located the valve piston which is pushed shut by the return spring 15 of the solenoid. When solenoid is energised by the ECU the direct coupled actuator rod opens the diversion path.

Figure 9:
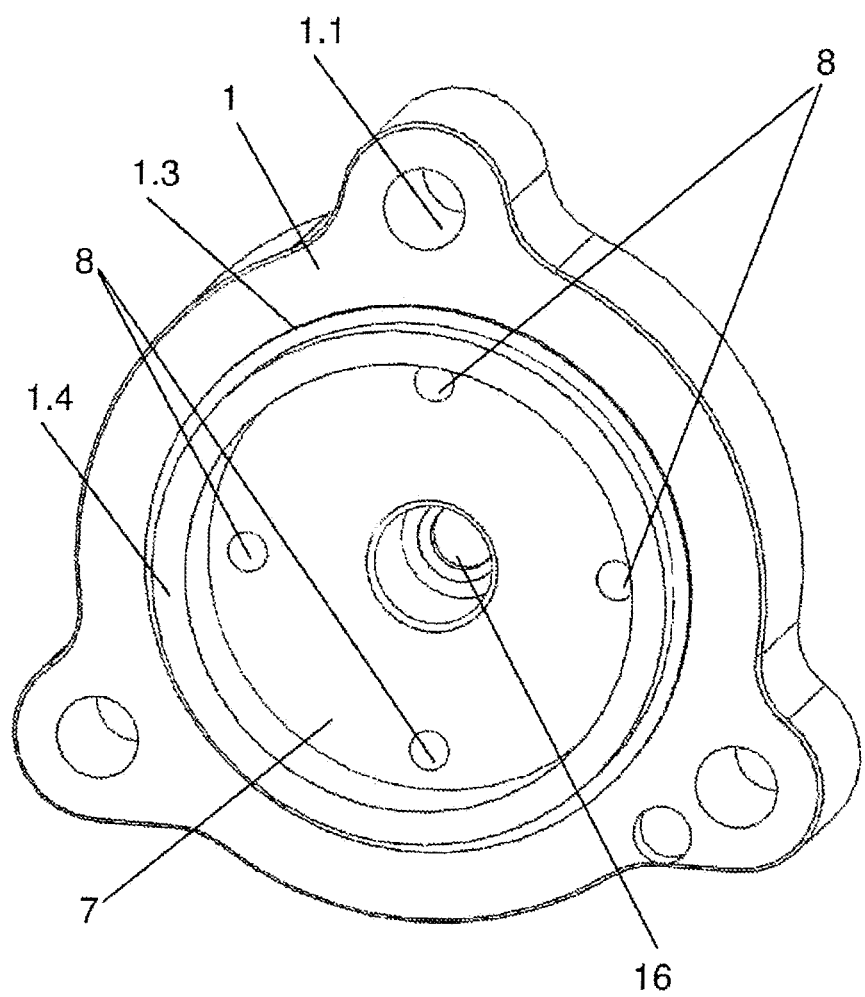
FIG. 9 illustrates a lower perspective view of the valve body of FIG. 8.

Illustrated in FIGS. 8 and 9 are perspective views of the valve body 1 of previous Figures, showing three mounting holes 1.1, which pass through the valve body, while on a lower face a circular O-ring channel 1.2 is provided so as to receive an O-ring to seal with the upper surface of the mounting flange 3. Whereas in FIG. 9 there is visible in the upper side the chamber 7 and the entrance location or apertures of the four transfer passages 8. Also present is a circular flange 1.3 to substitute for the material of the inserted chamber 9.3 of the factory valve of FIG. 7, and a cylindrical flange 1.4 to provide the cylindrical wall of the chamber 7.

While the above description and drawings show an O-ring seal 16 on the end of the plunger 13, it will be readily understood that the seal 16 could be positioned on or around the control aperture 6.

The valve body 1, can be manufactured from any appropriate material and any appropriate method of manufacture. While most preferred is machining the valve body 1 from aluminum, or other metals such as brass or stainless steel could be used or plastic; or it could be injection moulded in polymeric material, die cast or made from sintered metals.

Metal deposition techniques could also be used and possibly 3D printing depending upon available polymers for such printing.

The piston 10 can be made from any appropriate material including aluminum, stainless steel or appropriate polymeric materials or metals.

Diverter valves as described above are commonly found in one of two locations, one is on a mounting flange that forms part of a supercharger or turbo compressor cover and includes a passage for incoming boost pressure, and one for the recirculation path. A second location used is a cast or machined mounting flange with the same inlet and outlet features but connected remotely to the intake via hoses.

While the above description is directed to embodiments which utilise a pre-existing solenoid to open or close the control aperture 6, or an OEM valve which uses a solenoid to do the same, it will be understood that other motive power means to open and close the control aperture 6 can be utilised such as pneumatic operation, whereby a negative pressure in the inlet tract is used to provide motive power to move a control valve member to take the place of the O-ring seal 16 and plunger 13.

Illustrated in FIG. 11 is another embodiment where the diverter valve system has a has two discrete body parts, so as to allow the location of the "upper" or first or actuator body part at one location in an engine bay and the "lower" or second or valve body part to be located on the turbocharger compressor or other component of the engine's intake tract at a second location in an engine bay. Like parts with the embodiment of FIGS. 1 to 6 have been like numbered. This embodiment of FIG. 11 is particularly advantageous in instances where the engine bay is organised such that there is not much space above the turbocharger compressor or other component of the engine's intake tract on which the diverter valve may be mounted.

In the split system of FIG. 11, the aperture 6 is effectively parted so that the aperture 6 is on the remote upper or first or actuator body 1.2, which connects to the port 6.1 on the lower or second or valve body 1, by means of tube 6.2. Whereas a single transfer passage 8 is split so that the lower or second or valve body 1 has a passage end 8.3 at the turbocharger compressor or other component of the engine's intake tract, while the remotely located body 1.2 has the other passage end 8.1 of the transfer passage 8, with ends 8.3 and 8.1 being connected by tube 8.2. The tubes 6.2 and 8.2 are a silicone rubber tubing which are capable of withstanding the boost pressure which may be present in the turbocharger system. Typical silicone vacuum hoses used for such purposes can readily withstand over 50 psi, but a hose's characteristics can be selected depending upon the conditions prevalent in a turbo charging system to which the embodiment is to be applied. In the embodiment of FIG. 11 only a single transfer passage 8 is provided so as to minimise the number of tubes 8.2 that need to be connected, thus also minimising install time, length of tubing required and any additional clutter around the diverter valve system components.

While the above embodiments describe the use of a bypass path in the diverter valve system, it will be understood that instead of a bypass path, the diverter system may divert to atmosphere.

In this specification, terms denoting direction, such as vertical, up, down, left, right, etc. or rotation, should be taken to refer to the directions relative to the corresponding Figure rather than to absolute directions unless the context require otherwise.

Where ever it is used, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It will be understood that the invention disclosed and defined herein extends to all alternative combinations of two or more of the individual features mentioned or evident from the text. All of these different combinations constitute various alternative aspects of the invention.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

The invention claimed is:

1. A turbo or super charged intake tract diverter valve having a body, comprising:
   a mounting flange having at least one mounting aperture through it;
   a generally cylindrical chamber formed in said body which is configured to receive a valve member, wherein said valve member is generally cylindrical with a substantially closed end at one end, said substantially closed end having an aperture through the closed end;
   wherein the body comprises
      at least one transfer passage extending through the body and ending in a port formed in said body;
      a frustoconical portion extending away from said mounting flange;
   wherein said generally cylindrical chamber is formed in said frustoconical portion of said body,
   and
   wherein said valve member comprises a seal on said substantially closed end.

2. The valve as claimed in claim 1, wherein said seal is a circumferential bead.

3. The valve as claimed in claim 2, wherein said seal is formed of silicone.

4. The valve as claimed in claim 1, wherein said seal is a face seal and includes a circumferential bead.

5. The valve as claimed in claim 1, wherein said at least one transfer passage is formed through said frustoconical portion.

6. The valve as claimed in claim 5, wherein said port of said at least one transfer passage is elliptical in shape.

7. The valve as claimed in claim 2, wherein said at least one transfer passage is formed through said frustoconical portion.

8. The valve as claimed in claim 7, wherein said port of said at least one transfer passage is elliptical in shape.

9. The valve as claimed in claim 4, wherein said at least one transfer passage is formed through said frustoconical portion.

10. The valve as claimed in claim 9, wherein said port of said at least one transfer passage is elliptical in shape.

* * * * *